United States Patent
Macours et al.

(10) Patent No.: US 10,643,595 B2
(45) Date of Patent: May 5, 2020

(54) ACOUSTIC PROCESSOR

(71) Applicant: GOODIX TECHNOLOGY (HK) COMPANY LIMITED, Hong Kong (HK)

(72) Inventors: Christophe Marc Macours, Hodelge (BE); Temujin Gautama, Boutersem (BE); Nicolas Vincens, Schaerbeek (BE)

(73) Assignee: GOODIX TECHNOLOGY (HK) COMPANY LIMITED, Hong Kong (HK)

( * ) Notice: Subject to any disclaimer, the term of this patent is extended or adjusted under 35 U.S.C. 154(b) by 6 days.

(21) Appl. No.: 15/935,348

(22) Filed: Mar. 26, 2018

(65) Prior Publication Data
US 2018/0350339 A1  Dec. 6, 2018

(30) Foreign Application Priority Data
May 31, 2017  (EP) .................................... 17173809

(51) Int. Cl.
| | |
|---|---|
| *H04R 3/02* | (2006.01) |
| *G10K 11/175* | (2006.01) |
| *G10K 11/178* | (2006.01) |
| *H04M 19/04* | (2006.01) |
| *G08B 6/00* | (2006.01) |
| *B06B 1/02* | (2006.01) |

(52) U.S. Cl.
CPC .......... *G10K 11/175* (2013.01); *B06B 1/0253* (2013.01); *G08B 6/00* (2013.01); *G10K 11/178* (2013.01); *H04M 19/047* (2013.01); *G10K 2210/129* (2013.01)

(58) Field of Classification Search
CPC ............... G10K 11/178; G10K 11/175; G10K 2210/1081
USPC .............................. 381/71.1–71.4, 73.1, 71.8
See application file for complete search history.

(56) References Cited

U.S. PATENT DOCUMENTS

| | | | |
|---|---|---|---|
| 9,319,150 B2 | 4/2016 | Peeler et al. | |
| 9,723,119 B2 | 8/2017 | Peeler et al. | |
| 2007/0010999 A1* | 1/2007 | Klein ....................... | G10L 19/04 704/211 |

(Continued)

FOREIGN PATENT DOCUMENTS

| | | |
|---|---|---|
| EP | 2 237 573 A1 | 10/2010 |
| KR | 20-2013-0024420 A | 3/2013 |
| WO | WO-2013/134388 A1 | 9/2013 |

OTHER PUBLICATIONS

Precision Microdrives: "Tech Blog—What Vibration Frequency is Best for Haptic Feedback?"; retrieved from the internet http://www.precisionmicrodrives.com/tech-blog/2014/02/27/what-vibration-frequency-is-best-for-haptic-feedback-1; 4 pages (Mar. 22, 2018).

(Continued)

*Primary Examiner* — Rasha S Al Aubaidi (57) ABSTRACT

A method and apparatus of acoustic processing for a mobile device having a haptic actuator is described. A vibration drive signal for driving a haptic actuator is received. A vibration noise output from a haptic actuator is detected. At least one vibration noise metric from the detected vibration noise output and the vibration drive signal is generated. The vibration noise output level is adapted in dependence of the at least one vibration noise metric.

14 Claims, 5 Drawing Sheets

(56) References Cited

U.S. PATENT DOCUMENTS

| | | | |
|---|---|---|---|
| 2010/0153845 A1 | 6/2010 | Gregorio et al. | |
| 2011/0075835 A1 | 3/2011 | Hill | |
| 2012/0229264 A1 | 9/2012 | Company Bosch et al. | |
| 2012/0286943 A1 | 11/2012 | Rothkopf et al. | |
| 2014/0119569 A1 | 5/2014 | Peeler et al. | |
| 2015/0311697 A1* | 10/2015 | Faxvog | H02H 7/04 361/35 |
| 2016/0023245 A1 | 1/2016 | Zadesky et al. | |
| 2018/0061192 A1* | 3/2018 | Chen | G06F 3/016 |

OTHER PUBLICATIONS

Precision Microdrives; "Linear Resonant Actuators—LRAS"; retreived from the internet http://www.precisionmicrodrives.com/vibrating-vibrator-vibration-motors/linear-resonant-actuator-lra-haptic-vibration-motors; 7 pages (Mar. 22, 2018).

* cited by examiner

ACOUSTIC PROCESSOR

CROSS-REFERENCE TO RELATED APPLICATIONS

This application claims the priority under 35 U.S.C. § 119 of European patent application no. 17173809.9, filed May 31, 2017 the contents of which are incorporated by reference herein.

This disclosure relates to acoustic signal processing for mobile devices having haptic actuators.

Many mobile devices such as mobile phones make use of haptic motors or actuators for generating vibration alerts or more complex haptic patterns to enhance man-device interaction. Recent mobile devices are equipped with AC-driven Linear Resonant Actuators (LRAs) in favour of DC-driven Eccentric Rotating Mass (ERM) motors. Linear Resonant Actuators are typically capable of producing more complex haptic effects than ERM motors.

While vibrating, a haptic motor typically produces audible noises that may degrade the end-user experience. For example, if a device is configured to operate silently, it is desirable that the haptic motor does not generate audible vibration noise when being activated.

The audible vibration noise produced by the haptic motor while in operation has several different origins. Firstly, there is motor noise, which is the noise produced by the haptic actuator itself. It results from air pressure changes induced by the displacement of the moving mass and from mechanical noise originating from vibrations of the whole motor assembly. The motor noise level is usually limited and specified by the haptic actuator vendor. Secondly, there is device noise, which is the noise resulting from the vibrations of the entire device. Device noise is strongly dependent on the device mechanical design. In a device that is mechanically designed with the haptic actuator tightly attached to the device housing, the device noise does not contribute much to the total noise generated by the haptic actuator. Thirdly, there is environment noise, which is the noise caused by surfaces or objects that are loosely mechanically coupled to the device. The noise properties such as noise level, or noise timbre are strongly dependent on the type of mechanical coupling. Environmental noise is the main and least predictable component of the haptic actuator noise.

Various aspects of the disclosure are defined in the accompanying claims. In a first aspect, there is defined an acoustic processor for a mobile device having a haptic actuator, the acoustic processor comprising a vibration noise analyser having a drive signal input configured to receive a vibration drive signal for driving a haptic actuator; an acoustic sensor input for receiving a vibration noise signal corresponding to a vibration noise output from the haptic actuator; a vibration noise analyser output; and a controller having a controller input coupled to the vibration noise analyser output, and a controller output configured to output the vibration drive signal; wherein the vibration noise analyser is configured to generate at least one vibration noise metric from the vibration noise signal, and the controller is configured to adapt the level of the vibration noise output in dependence of the at least one vibration noise metric.

In embodiments, the controller may be configured to adapt the vibration noise output level by adapting the vibration drive signal.

In embodiments, the controller may comprise a vibration drive signal processor coupled to the vibration noise analyser output, wherein the vibration drive signal processor is configured to adapt the vibration drive signal by at least one of an adaptation of the amplitude of the vibration drive signal and an adaptation of the frequency of the vibration drive signal.

In embodiments, the controller may be configured to adapt the vibration noise by generating a cancellation signal for transmission via a loudspeaker to destructively interfere with the vibration noise output.

In embodiments, the controller may comprise an active noise canceller coupled to the vibration noise analyser output, wherein the active noise canceller is configured to receive the vibration drive signal and output a cancellation signal in dependence of the at least one vibration noise metric.

In embodiments, the controller may be further configured to receive an orientation signal and wherein the vibration noise level is further adapted in dependence of the orientation signal.

In embodiments, the controller may be further configured to invert the polarity of one of the cancellation signal and the vibration drive signal dependent on the orientation signal.

The vibration noise metric may comprise a measure of the distortion of the detected vibration noise.

In embodiments, the controller may be configured to maintain the vibration noise output level within a predetermined range.

In embodiments of the acoustic processor, the vibration noise analyser may comprise a harmonic distortion calculator. The harmonic distortion calculator may be configured to receive the acoustic input signal and a drive signal frequency value, and output the at least one vibration noise metric, wherein the at least one vibration noise metric comprises the harmonic distortion of the received acoustic signal with respect to the vibration drive signal.

In embodiments, the vibration noise analyser may comprise a tone tracker coupled to the harmonic distortion calculator, and wherein the tone tracker is configured to receive the vibration drive signal and to output a frequency value to the harmonic distortion calculator.

Embodiments of the acoustic processor may be included in a mobile device further comprising a haptic actuator coupled to the controller output, and an acoustic transducer coupled to the acoustic sensor input.

Embodiments of the acoustic processor may be included in a mobile device wherein the acoustic sensor input is coupled to the haptic actuator and the acoustic processor is configured to receive a signal representing the haptic actuator current, wherein the vibration noise signal comprises the haptic actuator current signal.

In a second aspect, there is described a method of audio processing for a mobile device having a haptic actuator, the method comprising: receiving a vibration drive signal for driving a haptic actuator; detecting a vibration noise signal representing a vibration noise output from a haptic actuator; generating at least one vibration noise metric from the vibration noise signal and the vibration drive signal; and adapting the level of vibration noise output in dependence of the at least one vibration noise metric.

In embodiments, adapting the vibration noise output level may comprise at least one of processing the vibration drive signal and generating a cancellation signal for transmission via a loudspeaker.

In a third aspect, there is described a computer program product comprising instructions which, when being executed by a processing unit, cause said processing unit to perform the steps of receiving a vibration drive signal for driving a haptic actuator; detecting a vibration noise output from a haptic actuator; generating at least one vibration noise metric from the detected vibration noise output and the vibration drive signal; and adapting the level of vibration noise output in dependence of the at least one vibration noise metric.

BRIEF DESCRIPTION OF DRAWINGS

In the figures and description like reference numerals refer to like features. Embodiments are now described in detail, by way of example only, illustrated by the accompanying drawings in which.

Figure 1:
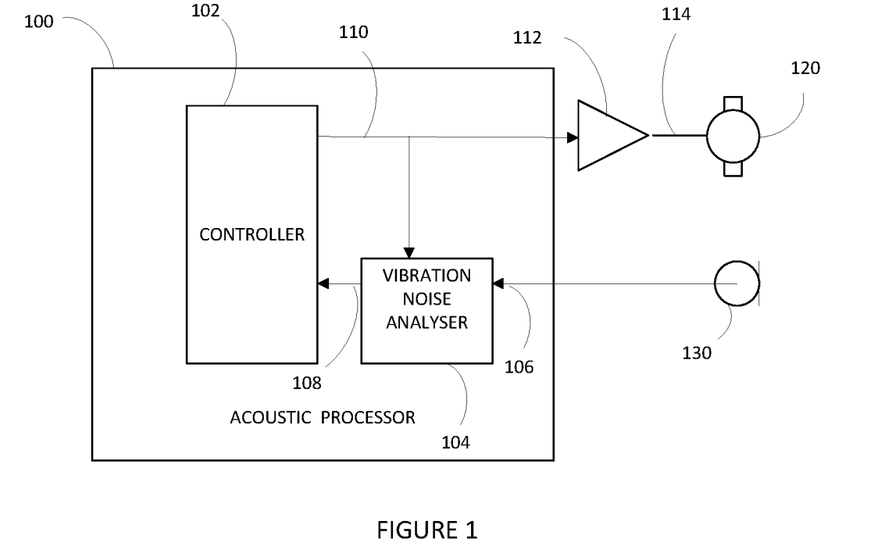
FIG. 1 shows an acoustic processor according to an embodiment.

FIG. 1 shows an acoustic processor 100 according to an embodiment. The acoustic processor 100 includes a controller 102 and a vibration noise analyser 104. The vibration noise analyser 104 may have an acoustic sensor input 106. The vibration noise analyser 104 may have a vibration noise analyser output 108 connected to the controller 102. The vibration noise analyser 104 may have a haptic drive signal input 110 connected to a haptic drive signal output of the controller 102.

In operation, the acoustic processor 100 may be connected to a haptic driver 112. A haptic driver output 114 may be connected to a haptic motor 120 such as a linear resonant actuator. The acoustic sensor input 106 may be connected to an acoustic transducer 130. In some examples, the acoustic transducer may be a microphone. In other examples the acoustic transducer may be a speaker configured as a microphone. In other examples the acoustic sensor input may be connected to the haptic motor 120 and be configured to receive a current sense signal which may correspond to the vibration noise signal.

A drive signal which may be generated by the controller 102 may be applied to the haptic actuator through a haptic actuator driver 112. In other examples, the drive signal may be generated independently of the controller 102. The drive signal may be a single frequency corresponding to a resonant frequency of the haptic actuator 120. In other examples the drive signal may have more than one frequency or may have a variable frequency. The acoustic sensor 130 may detect the vibration noise signal. The vibration noise analyser 104 may process the vibration noise signal in comparison with the generated drive signal and output vibration metrics indicative of the acoustical noise properties of the haptic actuator 120. The vibration metrics may include for example the spectrum, level, cross-correlation, and harmonic distortion. Harmonic distortion metrics may include total harmonic distortion, total harmonic distortion with noise. Based on these metrics, the controller 102 may adjust the drive signal properties for example the frequency, or the amplitude of the drive signal.

The vibration noise analyser 104 may analyse the amount of energy outside the frequency band of the driving frequency, determined from the driving signal on the driving signal input 110. The energy outside the frequency band may include distortion components resulting from the unwanted vibrations. By specifically analysing the harmonic frequencies of the driving frequency, the inventors of the present disclosure have appreciated that it may be possible to discriminate between vibration-related ambient noise due to the haptic motor 120 and ambient noise. Discriminating between vibration-related ambient noise and ambient noise may result in a more robust determination of the vibration noise due to the haptic motor 120. By improving the prediction of the vibration noise, the controller 102 may accurately adapt the vibration drive signal to control the perceived noise due to the haptic actuator. In some examples, the controller 102 may adapt the drive signal by reducing the amplitude and/or changing the frequency to maintain the detected level of acoustic vibration noise within a predetermined level. Some mobile devices, such as mobile phones, may use a haptic actuator for a vibrate mode. In such mobile devices, the acoustic processor 100 may limit the unwanted noise due to the haptic actuator to keep the audible noise within acceptable limits. In some examples, the controller 102 may turn off the drive signal and switch a mobile phone to a different mode of operation, such as flashing the display (not shown).

The acoustic processor 100 may be implemented in hardware, software or a combination of hardware and software. For example, the vibration noise analyser 104 may be implemented using dedicated analog and logic circuitry to connect to an external microphone or other acoustic transducer in combination with software running on a microprocessor. In other examples, the interface circuitry to connect to the microphone may be separate from the vibration noise analyser 104. The controller 102 may be implemented in logic hardware and/or software running on a digital signal processor or microprocessor. The vibration noise analyser 104 and the controller 102 may be implemented in the same device or different devices.

Figure 2:
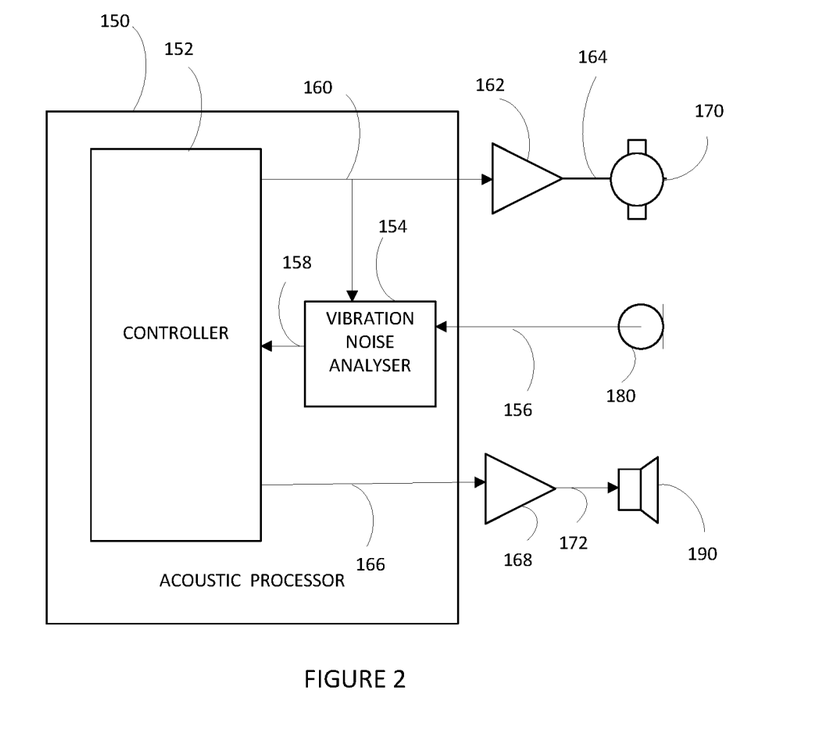
FIG. 2 illustrates an acoustic processor according to an embodiment.

FIG. 2 shows an acoustic processor 150 according to an embodiment. The acoustic processor 150 includes a controller 152 and a vibration noise analyser 154. The vibration noise analyser 154 may have an acoustic sensor input 156. The vibration noise analyser 154 may have a vibration noise analyser output 158 connected to the controller 152. The vibration noise analyser 154 may have a haptic drive signal input 160 connected to a haptic drive signal output of the controller 152. The controller 152 may have a loudspeaker output 166.

In operation, the acoustic processor 150 may be connected to a haptic driver 162. A haptic driver output 164 may be connected to a haptic motor 170 such as a linear resonant actuator. The acoustic sensor input 156 may be connected to a microphone 180. The controller loudspeaker output 166 may be connected to a speaker amplifier 168 which may be for example a class-D audio amplifier. The speaker amplifier 168 may have a speaker output 172 connected to a speaker 190.

A drive signal on haptic drive signal input 160 which may be generated by the controller 152. The drive signal may be applied to the haptic actuator through a haptic actuator driver 162 which may be a class D amplifier. In other examples the drive signal may be generated independently of the controller 152. The drive signal may be a single frequency corresponding to a resonant frequency of the haptic actuator. In other examples the drive signal may have more than one frequency or may have a variable frequency. The microphone 180 may detect the vibration noise signal which may correspond to the level of the vibration noise generated by the haptic actuator 170. The vibration noise analyser 154 may process the vibration noise signal in comparison with the generated drive signal and output vibration metrics indicative of the acoustical noise properties of the haptic actuator 170. The vibration metrics may include for example the spectrum, level, cross-correlation, and total harmonic distortion. Based on these metrics, the controller 152 may generate a cancellation signal for output via the loudspeaker 190. The cancellation signal may destructively interfere with the acoustic noise generated by the haptic actuator 170. In some examples the cancellation signal may be a single frequency corresponding to the drive signal frequency which is phase shifted with respect to the drive signal. The amount of phase shift generate may result in a phase shift of 180 degrees at a desired listening position. In other examples, the cancellation signal may include one or more frequencies corresponding to harmonics of the driver signal detected by the vibration noise analyser 154.

The vibration noise analyser 158 may analyse the amount of energy outside the frequency band of the driving frequency, determined from the driving signal on the driving signal input 160. The energy outside the frequency band may include distortion components resulting from the unwanted vibrations. By specifically analysing the harmonic frequencies of the driving frequency, it may be possible to discriminate between vibration-related ambient noise due to the haptic motor 170 and ambient noise. This may result in a more robust determination of the vibration noise due to the haptic motor 170. The acoustic processor 150 may generate a cancellation signal to destructively interfere with generated vibration noise. In this way, the vibration noise level may be reduced. The acoustic processor 150 may maintain the vibration noise level within a predetermined range by adapting the cancellation signal dependent on the vibration metric or vibration metrics.

Figure 3:
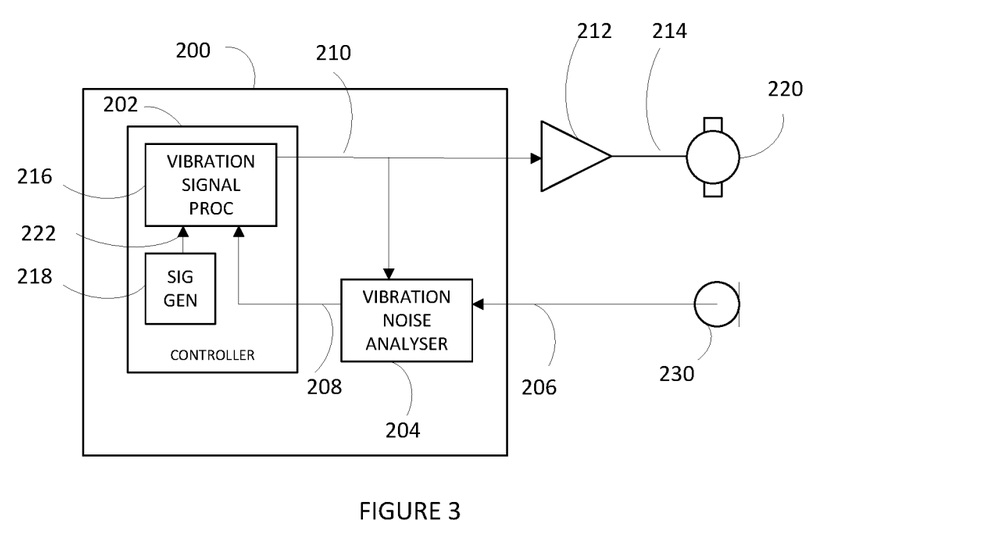
FIG. 3 shows an acoustic processor according to an embodiment.

FIG. 3 shows an acoustic processor 200 according to an embodiment. The acoustic processor 200 includes a controller 202 and a vibration noise analyser 204. The controller 202 includes a vibration signal processor 216 and a drive signal generator 218. The vibration noise analyser 204 may have an acoustic sensor input 206. The vibration noise analyser 204 may have a vibration noise analyser output 208 connected to the vibration signal processor 216. The vibration noise analyser 204 may have a haptic drive signal input 210 connected to a haptic drive signal output of the vibration signal processor 216. The drive signal generator 218 may have a drive signal output 222 connected to the vibration signal processor 216.

In operation, the acoustic processor 200 may be connected to a haptic driver 212. A haptic driver output 214 may be connected to a haptic motor 220 such as a linear resonant actuator. The acoustic sensor input 206 may be connected to an acoustic transducer 230. In some examples, the acoustic transducer may be a microphone. In other examples the acoustic transducer may be a speaker configured as a microphone. In other examples the acoustic sensor input may be connected to the haptic motor 220 and be configured to receive a current sense signal which may correspond to the vibration noise signal.

A drive signal on drive signal output 222 which may be generated by the signal generator may be processed by the vibration signal processor 216. The processed drive signal may be amplified by the haptic driver 212 in order to drive the haptic actuator 220. The drive signal may be a single frequency corresponding to a resonant frequency of the haptic actuator. In other examples, the drive signal may have more than one frequency or may have a variable frequency. The acoustic sensor 230 may detect the vibration noise signal. The level of the vibration noise signal may correspond to the level of the vibration noise output generated by the haptic actuator 220. The vibration noise analyser 204 may process the vibration noise signal in comparison with the generated drive signal and output vibration metrics indicative of the acoustical noise properties of the haptic actuator 220. The vibration metrics may include for example the spectrum, level, cross-correlation, and total harmonic distortion. Based on these metrics, the vibration signal processor 216 may adjust the drive signal properties for example the frequency, or the amplitude of the drive signal.

The vibration noise analyser 204 may analyse the amount of energy outside the frequency band of the driving frequency, determined from the driving signal on the driving signal input 210. The energy outside the frequency band may include distortion components resulting from the unwanted vibrations. By specifically analysing the harmonic frequencies of the driving frequency or frequencies, it may be possible to discriminate between vibration-related ambient noise due to the haptic motor 220 and ambient noise. This may result in a more robust determination of the vibration noise due to the haptic motor 220. The vibration-related ambient noise may also be referred to as the vibration noise output level. By improving the prediction of the vibration noise, the vibration signal processor 216 may accurately adapt the vibration drive signal to control the perceived noise due to the haptic actuator 220. In some examples, the vibration signal processor 216 may adapt the drive signal generated by the signal generator 218 by changing the amplitude and/or changing the frequency dependent on the vibration noise metrics. The vibration signal processor 216 may adapt the drive signal to maintain the detected level of acoustic vibration noise within a predetermined level. In examples where the generated driving signal is a single tone, the vibration signal processor may adapt the signal by changing the amplitude. In examples where the driving signal is a multi-tone or broadband signal, the vibration signal processor may adapt the driving signal in the frequency domain in order to account for the frequency-dependent characteristics of the vibration noise produced by the haptic actuator and detected on the acoustic sensor input 206.

Figure 4:
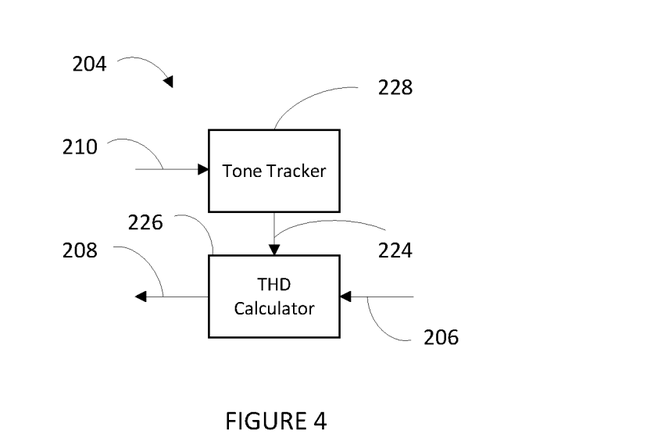
FIG. 4 shows further details of the vibration analyser used in the acoustic processor of FIG. 3.
Figure 5:
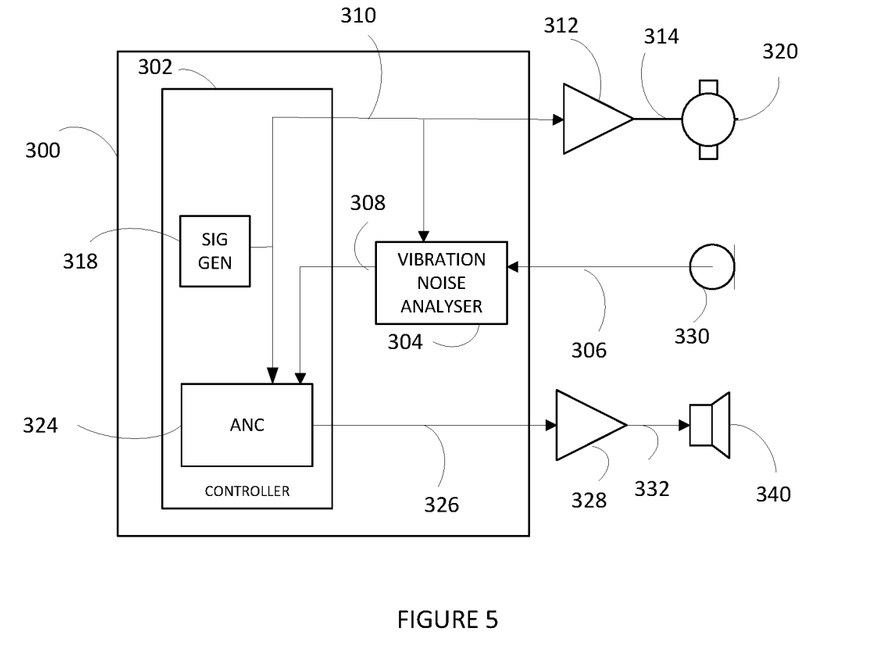
FIG. 5 illustrates an acoustic processor according to an embodiment.

FIG. 4 shows further detail of the vibration noise analyser 204 for a single tone drive signal. It will be appreciated that similar features may be included in other vibration noise analysers described herein. A tone tracker 228 may be connected to drive signal input 210 and a tone tracker output 224 may be connected to total harmonic distortion (THD) calculator 226. THD calculator 226 may have an input connected to acoustic sensor input 206 and an output connected to the vibration noise analyser output 208. The tone tracker 228 may provide the frequency information to the THD calculator 224. The THD calculator 226 may analyse the amount of energy outside the frequency band of the driving frequency, where distortion components resulting from the unwanted vibrations may be located. The THD calculator 226 may output a measure of distortion of the detected acoustic noise signal compared to the original driving signal. This approach may be made robust against ambient acoustical noise by specifically analysing the harmonic frequencies of the driving frequency. Analysing the harmonic frequencies of the driving frequency may allow discrimination between vibration noise and ambient noise. The person skilled in the art will appreciate that additional detectors (not shown) can be used to further improve robustness against ambient noise FIG. 5 shows an acoustic processor 300 according to an embodiment. The acoustic processor 300 includes a controller 302 and a vibration noise analyser 304. The controller 302 includes an active noise controller 324 which may also be considered as an active noise canceller, and a drive signal generator 318. The vibration noise analyser 304 may have an acoustic sensor input 306. The vibration noise analyser 304 may have a vibration noise analyser output 308 connected to the active noise controller 324. The drive signal generator 318 may have a drive signal output connected to the drive signal input 310 of the vibration noise analyser 304. The drive signal generator 318 may have a drive signal output connected to a drive signal input of the active noise controller 304. The active noise controller 324 may have a loudspeaker output 326.

In operation, the signal generator output from the controller 302 of acoustic processor 300 may be connected to a haptic driver 312. A haptic driver output 314 may be connected to a haptic motor 320 such as a linear resonant actuator. The acoustic sensor input 306 may be connected to a microphone 330. The loudspeaker output 326 may be connected to a speaker amplifier 328 which may be for example a class-D audio amplifier. The speaker amplifier 328 may have a speaker output 332 connected to a speaker 340.

A drive signal on the drive signal input 310 may be generated by the drive signal generator 318. The drive signal may be applied to the haptic actuator through a haptic actuator driver 312, which may be a class D amplifier. In other examples, the drive signal may be generated independently of the controller 302. The drive signal may be a single frequency corresponding to a resonant frequency of the haptic actuator. In other examples the drive signal may have more than one frequency or may have a variable frequency. The microphone 330 may detect the vibration noise signal. The vibration noise analyser 304 may process the vibration noise signal in comparison with the generated drive signal and output vibration metrics indicative of the acoustical noise properties of the haptic actuator 320. The vibration metrics may include for example the spectrum, level, cross-correlation, and total harmonic distortion. Based on these metrics, the active noise controller 324 may generate a cancellation signal for output via the loudspeaker 340. The cancellation signal may destructively interfere with the acoustic noise generated by the haptic actuator 320. In some examples the cancellation signal may be a single frequency corresponding to the drive signal frequency which is phase shifted with respect to the drive signal. The amount of phase shift generate may result in a phase shift of 180 degrees at a desired listening position. In other examples, the cancellation signal may include one or more frequencies corresponding to harmonics of the driver signal detected by the vibration noise analyser 304.

The vibration noise analyser 304 may analyse the amount of energy outside the frequency band of the driving frequency, determined from the driving signal on the driving signal input 310. The energy outside the frequency band may include distortion components resulting from the unwanted vibrations. By specifically analysing the harmonic frequencies of the driving frequency, it may be possible to discriminate between vibration-related ambient noise due to the haptic motor 320 and ambient noise. This may result in a more robust determination of the vibration noise due to the haptic motor 320. The audio noise canceller 324 may generate a cancellation signal from the driver signal to destructively interfere with generated vibration noise. In this way, the vibration noise level may be reduced. The acoustic processor 300 may maintain the vibration noise level within a predetermined range by adapting the cancellation signal dependent on the vibration metric or vibration metrics.

Figure 6:
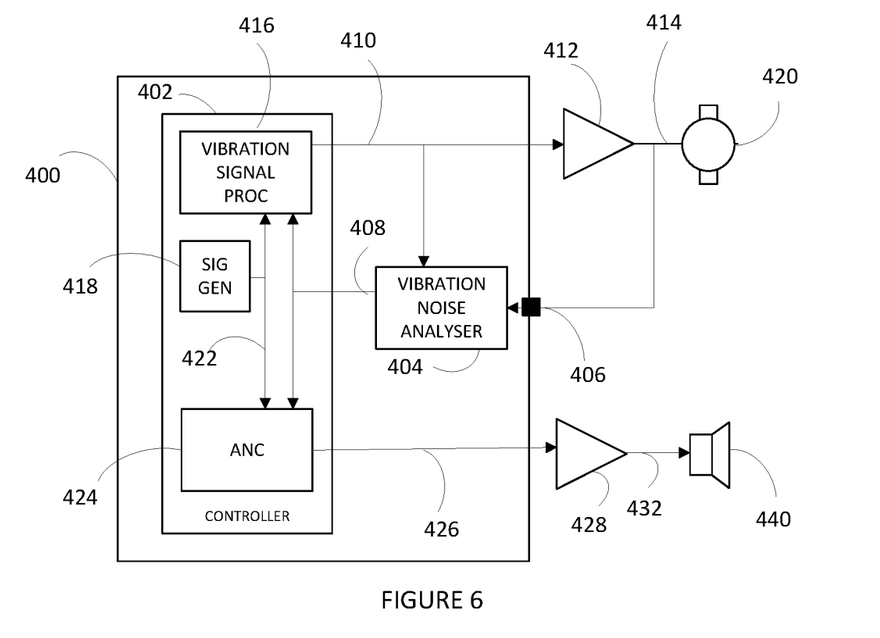
FIG. 6 shows an acoustic processor according to an embodiment.

FIG. 6 shows an acoustic processor 400 according to an embodiment. The acoustic processor 400 includes a controller 402 and a vibration noise analyser 404. The controller 402 includes an active noise controller 424 which may also be considered as an active noise canceller, a vibration signal processor 416, and a drive signal generator 418. The vibration noise analyser 404 may have an acoustic sensor input 406. The vibration noise analyser 404 may have a vibration noise analyser output 408 connected to the active noise controller 424 and the vibration signal processor 416. The vibration noise analyser 404 may have a haptic drive signal input 410 connected to a haptic drive signal output of the vibration signal processor 416. The drive signal generator 418 may have a drive signal output connected to vibration signal processor 416. The drive signal generator 418 may have a drive signal output 422 connected to a drive signal input of the active noise controller 424. The active noise controller 424 may have a loudspeaker output 426.

In operation, the vibration signal processor output from the controller 402 of acoustic processor 400 may be connected to a haptic driver 412. The haptic driver output 414 may be connected to a haptic motor 420 such as a linear resonant actuator. The acoustic sensor input 406 may be connected to the haptic driver output 414. The loudspeaker output 426 may be connected to a speaker amplifier 428 which may be for example a class-D audio amplifier. The speaker amplifier 428 may have a speaker output 432 connected to a speaker 440.

A drive signal on drive signal output 422 may be processed by the vibration signal processor 416. The processed drive signal may be output to the haptic driver 412. The vibration sensor input 406 may receive a current sense signal representing the current flowing through the coil haptic actuator 420. The current sense signal may correspond to a vibration noise signal representing the ambient vibration noise generated by the haptic actuator 420. The vibration noise analyser 404 may process the current sense signal in comparison with the generated drive signal and output vibration metrics indicative of the acoustical noise properties of the haptic actuator 420. The vibration metrics may include for example the spectrum, level, cross-correlation, and total harmonic distortion.

Based on these metrics, the active noise controller 424 may generate a cancellation signal for output via the loudspeaker 440. The cancellation signal may be generated from the generated drive signal on drive signal output 422. The cancellation signal may destructively interfere with the acoustic noise generated by the haptic actuator 420. In some examples the cancellation signal may be a single frequency corresponding to the drive signal frequency which is phase shifted with respect to the drive signal. The amount of phase shift generate may result in a phase shift of 180 degrees at a desired listening position. In other examples, the cancellation signal may include one or more frequencies corresponding to harmonics of the driver signal detected by the vibration noise analyser 404.

Alternatively, or in addition, the vibration signal processor 416 may adapt the processing of the generated drive signal dependent on the vibration noise metrics.

The vibration noise analyser 404 may analyse the amount of energy outside the frequency band of the driving frequency, determined from the driving signal on the driving signal input 410. The energy outside the frequency band may include distortion components resulting from the unwanted vibrations. By specifically analysing the harmonic frequencies of the driving frequency, it may be possible to discriminate between vibration-related ambient noise due to the haptic motor 420 and ambient noise. This may result in a more robust determination of the vibration noise due to the haptic motor 420. The active noise canceller 424 may generate a cancellation signal from the driver signal to destructively interfere with generated vibration noise. Alternatively, or in addition, the vibration signal processor 416 may adapt the processing of the generated drive signal dependent on the vibration noise metrics by modifying the frequency and/or the amplitude. In this way, the vibration noise level may be reduced. The acoustic processor 400 may maintain the vibration noise output level within a predetermined range by adapting the cancellation signal and/or the drive signal dependent on the vibration metric or vibration metrics.

Figure 7:
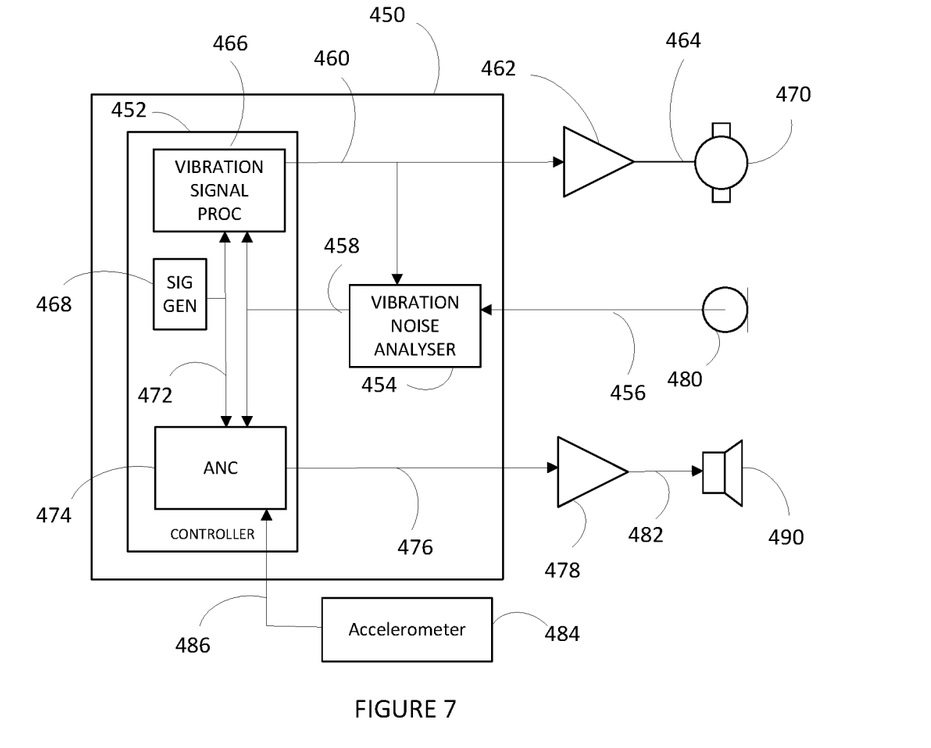
FIG. 7 illustrates an acoustic processor according to an embodiment.

FIG. 7 shows an acoustic processor 450 according to an embodiment. The acoustic processor 450 includes a controller 452 and a vibration noise analyser 454. The controller 452 includes an active noise controller 474 which may also be considered as an active noise canceller, a vibration signal processor 466, and a drive signal generator 468. The vibration noise analyser 454 may have an acoustic sensor input 456. The vibration noise analyser 454 may have a vibration noise analyser output 458 connected to the active noise controller 474 and the vibration signal processor 466. The vibration noise analyser 454 may have a haptic drive signal input 460 connected to a haptic drive signal output of the vibration signal processor 466. The drive signal generator 468 may have a drive signal output connected to the drive signal input of the vibration signal processor 466. The drive signal generator 468 may have a drive signal output 472 connected to a drive signal input of the active noise controller 474. The active noise controller 474 may have a loudspeaker output 476. The active noise controller may have a position or orientation sensor input 486.

In operation, the vibration signal processor output from the controller 452 of acoustic processor 450 may be connected to a haptic driver 462. The haptic driver output 464 may be connected to a haptic motor 470 such as a linear resonant actuator. The acoustic sensor input 456 may be connected to a microphone 480. The loudspeaker output 476 may be connected to a speaker amplifier 478 which may be for example a class-D audio amplifier. The speaker amplifier 478 may have a speaker output 482 connected to a speaker 490. The position sensor input 486 may be connected to an accelerometer 484.

A drive signal which may be generated by the drive signal generator 468 may be processed by the vibration signal processor 466. The processed drive signal may be output to the haptic driver 462. The microphone 480 may detect the vibration noise signal. The vibration noise analyser 454 may process the vibration noise signal in comparison with the generated drive signal and output vibration metrics indicative of the acoustical noise properties of the haptic actuator 470. The vibration metrics may include for example the spectrum, level, cross-correlation, and total harmonic distortion.

Based on these metrics, the active noise controller 474 may generate a cancellation signal for output via the loudspeaker 490. The cancellation signal may be generated from the generated drive signal on drive signal output 472. The cancellation signal may destructively interfere with the acoustic noise generated by the haptic actuator 470. In some examples the cancellation signal may be a single frequency corresponding to the drive signal frequency which is phase shifted with respect to the drive signal. The amount of phase shift generate may result in a phase shift of 180 degrees at a desired listening position. In other examples, the cancellation signal may include one or more frequencies corresponding to harmonics of the driver signal detected by the vibration noise analyser 454.

Alternatively, or in addition, the vibration signal processor 466 may adapt the processing of the generated drive signal dependent on the vibration noise metrics.

The vibration noise analyser 454 may analyse the amount of energy outside the frequency band of the driving frequency, determined from the driving signal on the driving signal input 460. The energy outside the frequency band may include distortion components resulting from the unwanted vibrations. By specifically analysing the harmonic frequencies of the driving frequency, it may be possible to discriminate between vibration-related ambient noise due to the haptic motor 470 and ambient noise. This may result in a more robust determination of the vibration noise due to the haptic motor 470. The audio noise canceller 474 may generate a cancellation signal from the driver signal to destructively interfere with generated vibration noise. Alternatively, or in addition, the vibration signal processor 466 may adapt the processing of the generated drive signal dependent on the vibration noise metrics by modifying the frequency and/or the amplitude. In this way, the vibration noise level may be reduced. The acoustic processor 450 may maintain the vibration noise level within a predetermined range by adapting the cancellation signal and/or the drive signal dependent on the vibration metric or vibration metrics.

The adaptive noise canceller 474 may also adapt the cancellation signal dependent on the orientation of a mobile device including the acoustic processor 450. The orientation may be determined from an orientation signal detected on the position sensor input 486.

Figure 8:
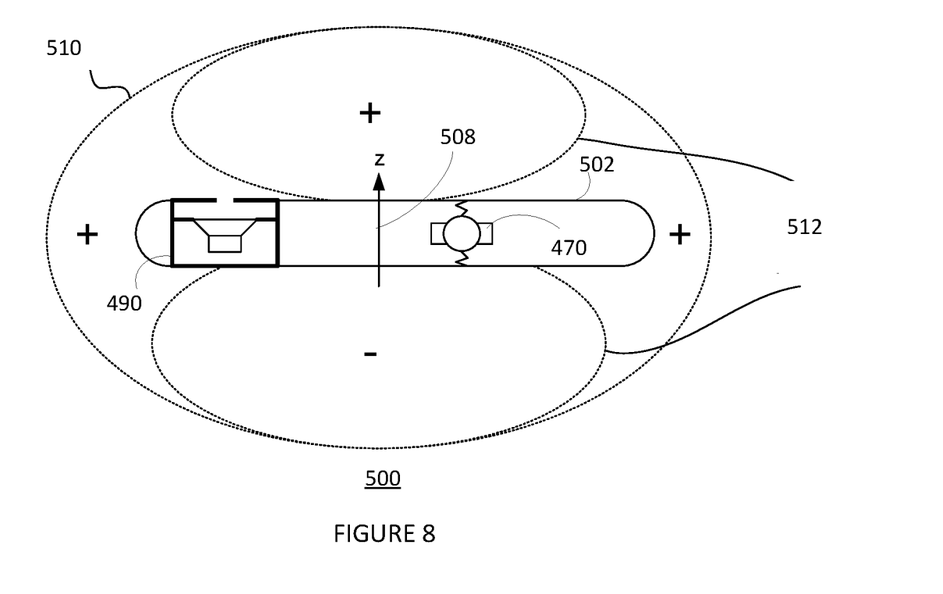
FIG. 8 illustrates the radiation pattern of a loudspeaker and a haptic actuator in a mobile device.

This may be further appreciated from FIG. 8 which illustrates the radiation pattern 500 of a loudspeaker 490 and a haptic actuator 470 in a mobile device 502. While vibrating along the z-axis 508, the mobile device 502 behaves like a dipole source where the sound pressure created at one side has an inverse polarity to the sound pressure created at the opposite side. This results in a well-known figure-of-eight polar pattern 512.

On the other hand, the loudspeaker 490, which is usually mounted in a closed box, exhibits an omnidirectional polar pattern 510, where sound radiates equally well in all directions with the same polarity. In the situation depicted in FIG. 8, the two sound fields 510, 512 will add up along the positive z-axis and cancel out along the negative z-axis. Depending on the orientation of the device 502 with respect to the user, it may be required to inverse the polarity of the cancellation signal or the driving signal in such a way that the two sound fields cancel out at the side of the listener. The adaptive noise canceller 474 may invert the polarity of the cancellation signal on loudspeaker output 476 dependent on the position of a mobile device including acoustic processor 450. In other examples the vibration signal processor may have a position sensor input and invert the polarity of the generated drive signal dependent on the position of a mobile device including an acoustic processor as described herein.

Figure 9:
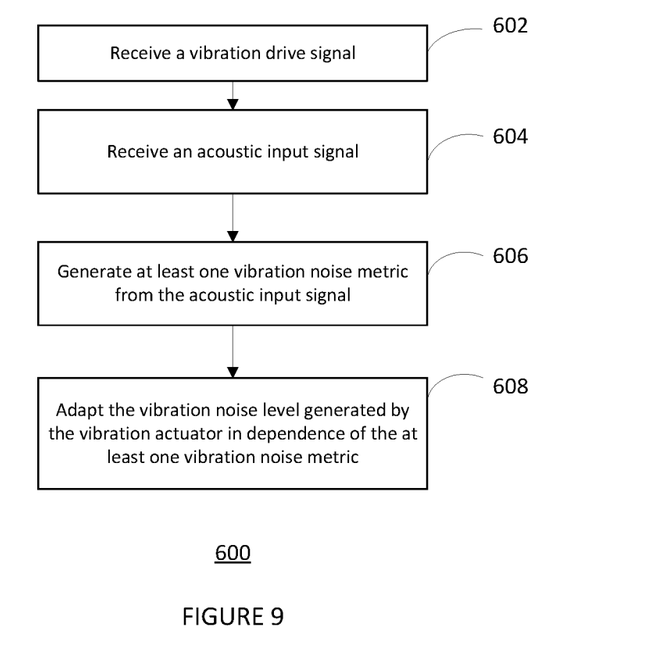
FIG. 9 shows a method of audio processing according to an embodiment.

FIG. 9 shows a method of audio processing 600. A vibration drive signal for driving a haptic actuator is received in step 602. In step 604 an acoustic input signal is detected which may include acoustic signals generated from a haptic actuator. In step 606 at least one vibration noise metric is generated from the acoustic input signal and the vibration drive signal. In step 608 the haptic actuator drive level is adapted in in dependence of the at least one vibration noise metric.

Embodiments of the acoustic processor described herein may be included in mobile devices having a haptic actuator. Such mobile devices may include mobile phones, tablet computers, laptop computers, wearable devices such as smart watches, hearable devices, portable medical devices. Embodiments described may be implemented in hardware, software or a combination of hardware and software.

A method and apparatus of acoustic processing for a mobile device having a haptic actuator is described. A vibration drive signal for driving a haptic actuator is received. A vibration noise output from a haptic actuator is detected. At least one vibration noise metric from the detected vibration noise output and the vibration drive signal is generated. The vibration noise output level is adapted in dependence of the at least one vibration noise metric.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An acoustic processor for a mobile device having a haptic actuator, the acoustic processor comprising:
   a vibration noise analyser having a drive signal input configured to receive a vibration drive signal for driving the haptic actuator;
   an acoustic sensor input for receiving a vibration noise signal corresponding to a vibration noise output from the haptic actuator;
   a vibration noise analyser output; and
   a controller having a controller input coupled to the vibration noise analyser output, and a controller output configured to output the vibration drive signal;
   wherein the vibration noise analyser is configured to generate at least one vibration noise metric from the vibration noise signal, and the controller is configured to adapt a level of the vibration noise output in dependence of the at least one vibration noise metric; and
   wherein the controller is configured to adapt the vibration noise output level by generating a cancellation signal for transmission via a loudspeaker to destructively interfere with the vibration noise output.

2. The acoustic processor of claim 1
   wherein the controller is configured to adapt the vibration noise output level by adapting the vibration drive signal.

3. The acoustic processor of claim 2
   wherein the controller comprises a vibration drive signal processor coupled to the vibration noise analyser output,
   wherein the vibration drive signal processor is configured to adapt the vibration drive signal by at least one of an adaptation of an amplitude of the vibration drive signal and an adaptation of a frequency of the vibration drive signal.

4. The acoustic processor of claim 1:
   wherein the controller comprises an active noise canceller coupled to the vibration noise analyser output,
   wherein the active noise canceller is configured to receive the vibration drive signal and output a cancellation signal in dependence of the at least one vibration noise metric.

5. The acoustic processor of claim 1:
   wherein the controller is further configured to receive an orientation signal and wherein the vibration noise output level is further adapted in dependence of the orientation signal.

6. The acoustic processor of claim 5
   wherein the controller is further configured to invert a polarity of one of the cancellation signal and the vibration drive signal dependent on the orientation signal.

7. The acoustic processor of claim 1
   wherein the vibration noise metric comprises a measure of a distortion of the detected vibration noise.

8. The acoustic processor of claim 1
   wherein the controller is configured to maintain the vibration noise output level within a predetermined range.

9. The acoustic processor of claim 1
   wherein the vibration noise analyser comprises a harmonic distortion calculator, and wherein the harmonic distortion calculator is configured to receive the acoustic input signal and a drive signal frequency value, and output the at least one vibration noise metric,
   wherein the at least one vibration noise metric comprises the harmonic distortion of the received acoustic signal with respect to the vibration drive signal.

10. The acoustic processor of claim 9
    wherein the vibration noise analyser comprises a tone tracker coupled to the harmonic distortion calculator, and
        wherein the tone tracker is configured to receive the vibration drive signal and to output a frequency value to the harmonic distortion calculator.

11. A mobile device comprising the acoustic processor according to claim 1 and further comprising
    a haptic actuator coupled to the controller output, and
    an acoustic transducer coupled to the acoustic sensor input.

12. A mobile device comprising the acoustic processor according to claim 1:

wherein the acoustic sensor input is coupled to the haptic actuator and the acoustic processor is configured to receive a signal representing the haptic actuator current;

wherein the vibration noise signal comprises the haptic actuator current signal further comprising the loudspeaker coupled to receive the cancellation signal from the controller.

13. The acoustic processor of claim 1:

further comprising a position sensor input representing a position of the mobile device;

wherein the controller is configured to invert a polarity of the cancellation signal for transmission via the loudspeaker based on the position of the mobile device.

14. A method of acoustic processing for a mobile device having a haptic actuator, the method comprising:

receiving a vibration drive signal for driving the haptic actuator;

detecting a vibration noise signal representing a vibration noise output from a haptic actuator;

generating at least one vibration noise metric from the vibration noise signal and the vibration drive signal;

adapting the level of the vibration noise output in dependence of the at least one vibration noise metric; and adapting the vibration noise output level by generating a cancellation signal for transmission via a loudspeaker to destructively interfere with the vibration noise output.

* * * * *